United States Patent [19]

Tanaka

[11] 4,245,240
[45] Jan. 13, 1981

[54] COLOR CAMERA HAVING LINEAR SCANNING ARRAYS AND VERTICAL SCANNING MIRROR

[75] Inventor: Shunpei Tanaka, Hachioji, Japan

[73] Assignee: Olympus Optical Co., Ltd., Tokyo, Japan

[21] Appl. No.: 22,268

[22] Filed: Mar. 20, 1979

[30] Foreign Application Priority Data

Mar. 29, 1978 [JP] Japan ................................ 53-35341

[51] Int. Cl.³ .......................... H04N 9/07; H04N 3/15
[52] U.S. Cl. ...................................... 358/43; 358/208; 358/213
[58] Field of Search .................... 358/41, 43, 44, 48, 358/50, 52, 53–55, 213, 206, 208, 212, 75–80, 285–288, 293, 294; 250/235, 236; 350/285

[56] References Cited

U.S. PATENT DOCUMENTS

| | | | |
|---|---|---|---|
| 3,835,249 | 9/1974 | Dattilo et al. | 358/285 |
| 3,952,328 | 4/1976 | Biber | 358/54 |
| 4,122,462 | 10/1978 | Hirayama et al. | 358/285 |

OTHER PUBLICATIONS

Simms, "The Application of CCD's to Document Scanning", *Microelectronics*, vol. 7, No. 2, pp. 60–63, Dec. 1975.
Kennedy, "Covert, Solid State Imaging System", *Proceedings of the SPIE 1st Annual Technical Symposium: Photo-Optical Instrumentation Applications and Theory*, San Francisco, Calif. 11–14 Aug. 1969, pp. 43–47.

*Primary Examiner*—John C. Martin
*Attorney, Agent, or Firm*—Haseltine, Lake & Waters

[57] ABSTRACT

A picking-up apparatus such as a color television camera for converting an image of an object to be picked-up into an electrical picture signal comprises a lens system such as an objective lens system for forming the image of the object on an image plane, a scanner comprising a swingable plane mirror for optically scanning the image of the object in a first direction, i.e. a vertical direction of a television raster scan, at least one linear image sensor array of self-scanning type arranged in said image plane in a second direction which is perpendicular to the first direction; i.e. a horizontal direction of the television raster scan, and a control and process circuit for driving the scanner and linear image sensor array in synchronism with each other.

8 Claims, 6 Drawing Figures

COLOR CAMERA HAVING LINEAR SCANNING ARRAYS AND VERTICAL SCANNING MIRROR

BACKGROUND OF THE INVENTION

The present invention relates to a picking-up apparatus for converting an optical image of an object into an electrical picture signal, particularly a television signal.

In known picking-up apparatuses such as a television camera a vidicon tube is generally used as an image picking-up device. However television cameras comprising the vidicon tube are very large in size, heavy in weight, and quite expensive in cost, because even the smallest one the vidicon tube has a diameter of 16.93 mm (⅝ inches) and a length of 150 mm (5.9 inches). Moreover deflection coils, focusing coils, etc. are also large and heavy and a power dissipated at a heater and various electrodes are also large. Further in order to drive the vidicon tube properly it is necessary to provide a power supply source of large capacity. A color television camera comprises a single vidicon tube or a plurality of vidicon tubes, e.g. three vidicon tubes. In the former camera it is difficult to obtain a high resolution in a displayed color image, while in the latter camera it is necessary to take into consideration a stability in registration, and further the size, weight and power consumption of such a camera are extremely large.

Nowadays there has been developed a semiconductor image sensor of self-scanning type such as BBD and CCD. These image sensors are formed by semiconductor integrated circuits and thus are inherently small in size, light in weight and little in power dissipation. When the television camera is formed by such semiconductor image sensor, it is necessary to provide a two dimensional image sensor array of self-scanning type consisting of 500×400 elements even for a black and white television camera tube. The number of elements should be further increased in case of a color television camera tube. According to the present technical level it is quite difficult to manufacture such a two dimensional image sensor array of large size without defects with a high yield. Therefore such an image sensor is liable to be very expensive.

SUMMARY OF THE INVENTION

The present invention has for its object to provide a picking-up apparatus which is small in size, light in weight, and cheap in cost and has excellent resolution by providing a linear image sensor array of self-scanning type which can be manufactured in a relatively simple manner with a high yield.

A picking-up apparatus for converting an optical image of an object into an electrical picture signal according to the invention comprises a lens system for forming on an image plane an image of an object to be picked-up;

a scanner for optically scanning the image of the object in a first direction;

a picking-up device including at least one linear image sensor array of self-scanning type arranged in said image plane in a second direction which is substantially perpendicular to said first direction; and means for driving said scanner and linear image sensor array in synchronism with each other.

DESCRIPTION OF THE PREFERRED EMBODIMENTS

Figure 1:
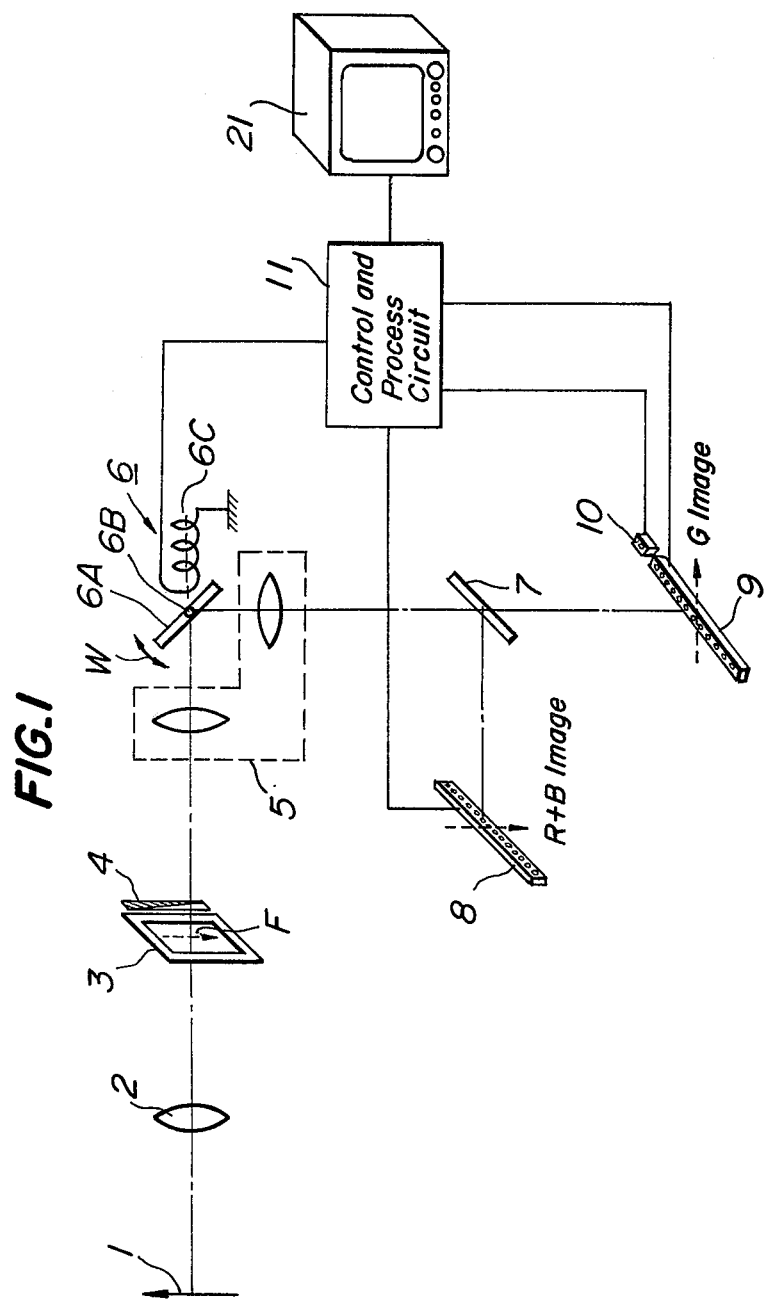
FIG. 1 is a schematic view showing an embodiment of a color television camera according to the invention.
Figure 2:
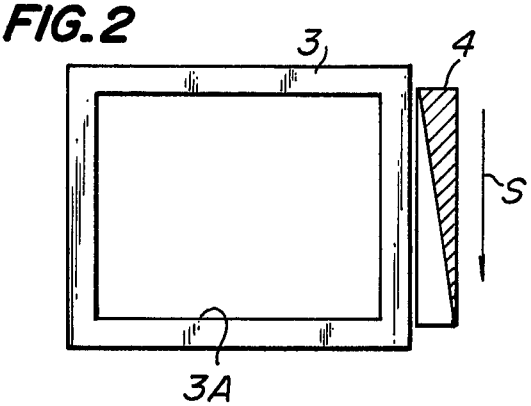
FIG. 2 is a plan view illustrating a picture frame and a scanning position indicating mark.

FIG. 1 is a schematic view illustrating an embodiment of the pick-up apparatus according to the invention for use in a color television display system. An image of an object 1 to be picked-up is formed by an objective lens system 2 on an image plane F. In this image plane there is arranged a picture frame 3 having formed a window 3A of suitable dimensions therein. As shown in FIG. 2 along one side of the frame 3 is provided a scanning position indicating mark 4 which comprises a luminescent portion in the form of a wedge in a scanning direction shown by an arrow S. An amount of light emitted from the mark 4 varies along the scanning direction S.

In order to scan the image of the object 1 formed in the image plane F there is provided a scanner 6 comprising a plane mirror 6A arranged swingably about an axis 6B as shown by an arrow W at a given period and an electromagnetically driving means 6C. In order to compensate a deviation in an optical path length due to angular position of the mirror 6A, i.e. deflection angle, an f-$\theta$ lens system 5 is provided. By means of such f-$\theta$ lens system 5 the image of the object is always formed on a flat object focal plane regardless of the deflection angle of the scanner 6. In this embodiment the f-$\theta$ lens system comprises two lenses, one of which is arranged in front of the mirror and the other behind the mirror viewed in the optical path.

A light ray reflected from the mirror 6A is incident upon a dichroic mirror 7 and is divided into a red and blue component and a green component. The red and blue component forms a red and blue image on a linear image sensor array 8 of self-scanning type such a CCD. The linear array 8 is arranged in a direction perpendicular to the scanning direction. Then the image sensor 8 produces red and blue color signals. The green color component passing through the dichronic mirror 7 forms a green image on a linear image sensor array 9 of self-scanning type which is arrange in a direction perpendicular to the scanning direction. This image sensor 9 produces a green color signal. Since the green signal is predominant in the luminance signal, the green signal may be used as the luminance signal.

Figure 3:
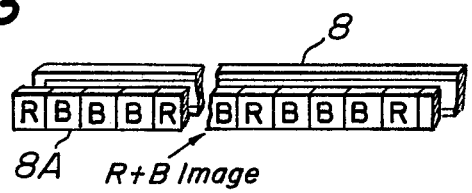
FIG. 3 is a perspective view showing an arrangement of a color filter and a linear image sensor array.

As shown in FIG. 3 in front of the linear image sensor array 8 is provided a color filter assembly 8A which includes red and blue color filter elements R and B, respectively. In this embodiment since use is made of the image sensor 8 composed of CCD which has a lower sensitivity for the blue light the number of the blue filter components B is three times larger than that of the red filter elements R. It should be noted that if the sensitivity of the image sensor 8 is substantially equal for red and blue light, the red and blue filter elements R and B may be arranged alternately.

The scanning position indicating mark 4 is also scanned by the scanner 6 and its image is formed on a photo-electric element 10 which is arranged substantially in alignment with the linear image scanner 9.

The picture signals from the linear image sensors 8 and 9 and an electrical output from the element 10 are supplied to a control and process circuit 11. The circuit 11 produces scanning clock pulses for the image sensors 8 and 9 in synchronism with the deflection angle of the scanner 6. Information with respect to the deflection angle is obtained from the output signal from the photoelectric element 10. For instance, an amplitude of the output signal from the element 10 varies in accordance with the deflection angle of the mirror 6A. The circuit 11 also supplies a driving signal to the driving means 6C of the scanner 6. In this manner the scanning of the scanner 6 and the image sensors 8 and 9 can be always made in synchronism with each other. The circuit 11 processes the picture signals supplied from the image sensors 8 and 9 so as to produce a color television signal adapted to given color television standards. The color television signal thus produced is supplied to a conventional color television receiver of monitor display device 21 and the image of the object 1 can be displayed on its screen. It is convenient that the control and process circuit 11 is so constructed that the scanning periods of the scanner 6 and the image sensors 8 and 9 are made in coincident with vertical and horizontal scanning periods, respectively of the color television standards.

Figure 4:
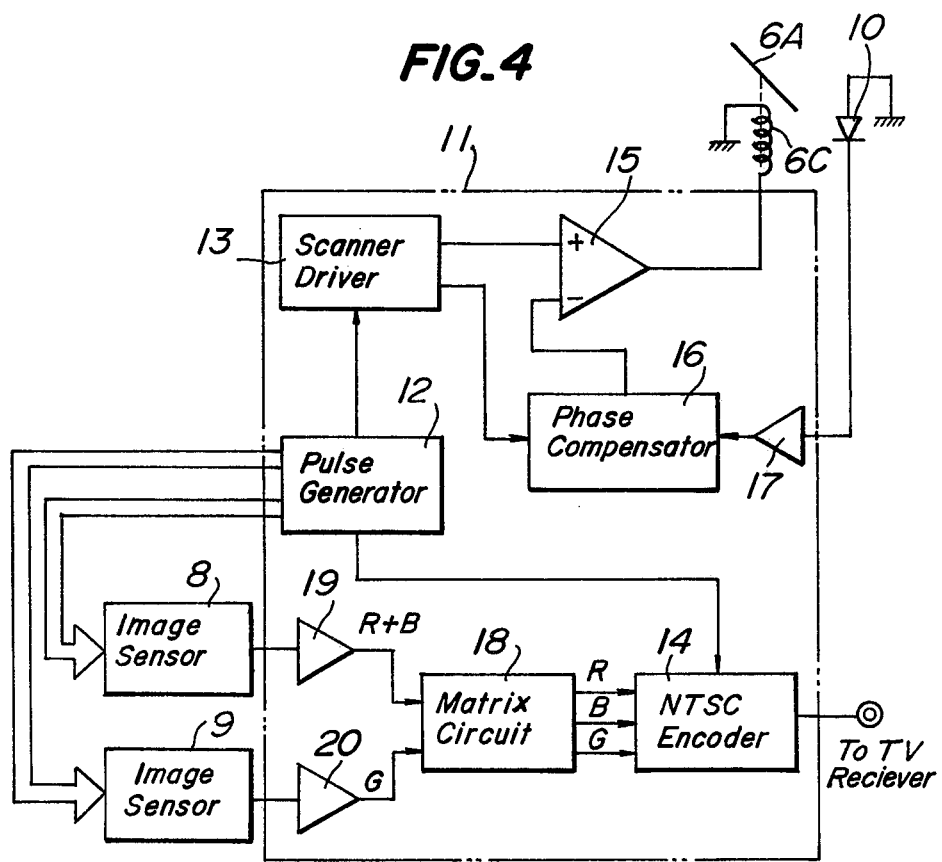
FIG. 4 is a block diagram depicting an embodiment of a control and process circuit.

FIG. 4 is a block diagram showing one embodiment of the control and process circuit 11. The circuit 11 comprises a standard pulse generator 12 which supplies given clock pulses to the linear image sensor arrays 8 and 9, vertical synchronizing pulses to a scanner driving circuit 13 and vertical and horizontal synchronizing pulses to an NTSC encoder 14. The scanner driving circuit 13 includes a waveform shaper circuit which converts the vertical synchronizing pulses into a sawtooth signal. The sawtooth signal thus formed is supplied to one input of a differential amplifier 15. The sawtooth signal is also supplied to a pluse compensator circuit 16, to which the sawtooth output signal supplied from the photoelectric element 10 due to the scanning of the scanning position indicating mark 4 (FIG. 2) is also fed through an amplifier 17. The phase compensator circuit 16 compares phases of these sawtooth signals to produce a phase difference and generates a phase compensating signal in accordance with the detected phase difference. This phase compensating signal is supplied to the other input of the differential amplifier 15. The output signal from the differential amplifier 15 is supplied to the electromagnetic means 6C of the scanner as the driving signal. In this manner the mirror 6A of the scanner can be swingably moved accurately in accordance with the sawtooth output signal from the scanner driving circuit 13. Since the sawtooth signal has the period equal to the vertical scanning period of the television standards the image of the object to be picked-up can be scanned vertically in synchronism with the vertical synchronizing period of the standard television signal.

The horizontal scanning of the image of object can be carried out by the self-scanning of the linear image sensor arrays 8 and 9 under the control of the clock pulses supplied from the standard pulse generator 12. Therefore the output picture signals from the linear arrays 8 and 9 can be considered as those obtained from a two-dimensional image sensor. The picture signals from the linear image sensor arrays 8 and 9 are supplied to a matrix circuit 18 through amplifiers 19 and 20, respectively. In the matrix circuit 18 the red and blue picture signal and the green picture signal are separated into red, blue and green color signals. These color signals are supplied to the NTSC encoder 14 which generates a color television signal with the given NTSC standards.

Figure 5:
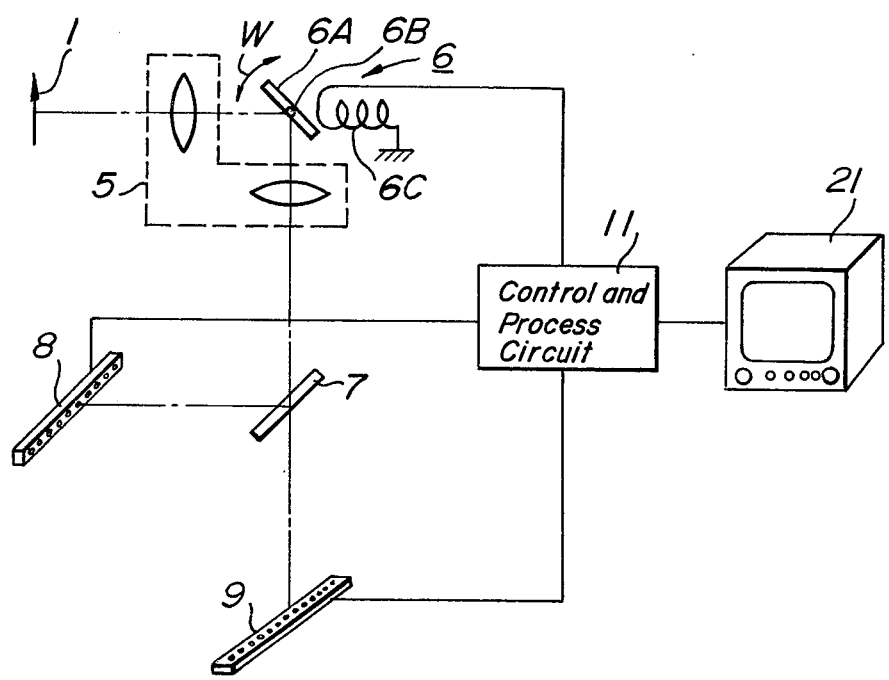
FIG. 5 is a schematic view illustrating another embodiment of the color camera according to the invention.
Figure 6:
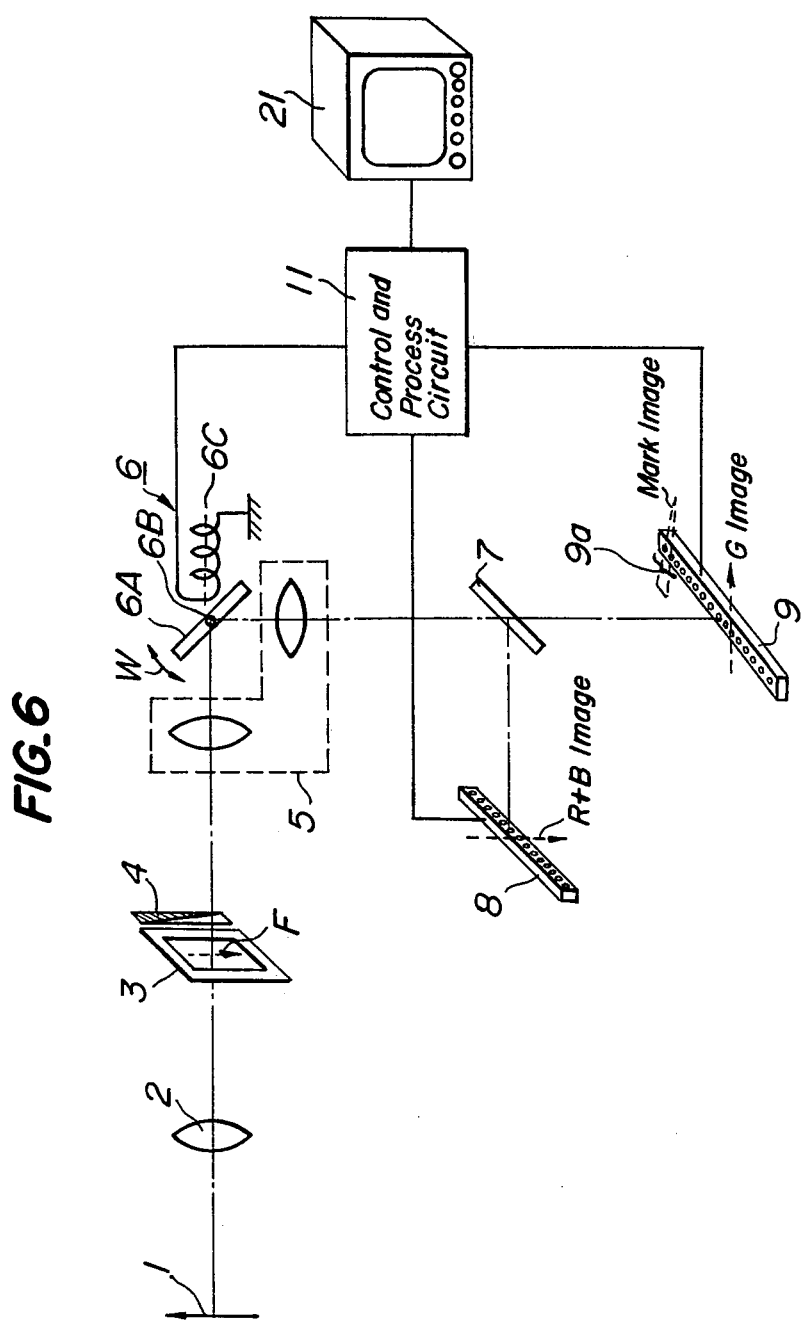
FIG. 6 is a schematic drawing illustrating the use of the linear image sensor array of the invention.

FIG. 5 is a schematic view illustrating another embodiment of the picking-up apparatus according to the invention. In this embodiment the linearity of a scanner 6 is excellent and thus it is not necessary to detect the scanning position of the scanner 6 and to compensate the phase difference of the dirving signal supplied to an electromagnetic driving means 6C of the scanner 6. Therefore in this embodiment it is possible to delete the scanning position indicating mark 4, the photoelectric element 10 and the phase compensator circuit 16 of the beforementioned embodiment. That is to say the sawtooth driving signal from the scanner driving circuit can be directly supplied to the electromagnetic driving means 6C of the scanner 6. Further in this embodiment an f-θ lens 5 has function of an objective lens and thus projects an image of an object 1 onto linear image sensor arrays 8 and 9. As shown in FIG. 6 successive elements 9a of the linear image sensor array 9 may be used for receiving the scanned image of the indicating mark 4.

As explained above according to the invention use can be made of the simple and cheap linear image sensor array and the image of the object to be picked-up is projected on the image sensor with scanning the image in the direction perpendicular to the scanning direction of the image sensor. Therefore the picking-up apparatus of the invention is quite cheap. Further the linear image sensor array can be constructed by the semiconductor image sensor array such as CCD and BBD and thus the picking-up apparatus according to the invention can be made small in size, light in weight and low in power consumption.

It should be noted that the present invention is not limited to the embodiments explained above, but many modifications can be conceived by those skilled in the art within the scope of the invention. In the above embodiments use is made of the two linear image sensor arrays 8 and 9 for obtaining the color picture signals, but the three color picture signals may be produced by a single linear image sensor array. In this case a color filter comprising the red, blue and green color filter elements may be arranged in front of the image sensor array. Since the green color signal may be used as a luminance signal the green color filter elements may be omitted. Further in case of producing a black and white television signal it is sufficient to provide a single linear image sensor array without a color filter. In the embodiment shown in FIG. 1 the scanned image of the scanning point indicating mark 4 is received by the separate photoelectric element 10 arranged in alignment with the image sensor array 9, but the element 10 may be provided in alignment with the other image sensor array 8. Further the photoelectric element 10 may be constructed by a plurality of successive elements of one of the linear image sensor arrays 8 and 9. Moreover the scanner 6 may comprise other scanning means such as a rotating multi-facet mirror wheel instead of the swinging plane mirror. Further it should be noted that when the deviation of the optical axis due to the deflection angle of the scanner may be neglected, the f-θ lens system may be omitted.

What is claimed is:

1. A picking up apparatus for converting an optical image of an object into an electrical picture signal comprising:
   an objective lens system for forming on a first image plane and image of an object to be picked-up;
   a scanner for optically scanning the image of the object in a first direction;
   a picking-up device having at least one linear image sensor array of self-scanning type arranged in a second image plane and in a second direction which is substantially perpendicular to said first direction;
   an f-θ lens system for transmitting the image formed on the first image plane of the objective lens system onto the linear image sensor array arranged in the second image plane; and
   means for driving said scanner and linear image sensor array in synchronism with each other.

2. An apparatus according to claim 1, wherein said apparatus further comprises a picture frame arranged in the image plane of the objective lens system and a mark arranged beside the frame and including a light emitting element, the emitted light intensity being changed along one side of the frame which coincides with said first scanning direction of the scanner, whereby said f-θ lens forms an image of the mark as well as the image of the object on the image plane in which the linear image sensor array is arranged.

3. An apparatus according to claim 2, wherein the apparatus further comprises a photoelectric converting element arranged in the second image plane in alignment with the linear image sensor array for receiving the image of the mark to produce an electrical signal representing a position of the image scanned by the scanner.

4. An apparatus according to claim 2, wherein the image of the mark is detected by at least one element of the linear image sensor array.

5. An apparatus according to claim 1, wherein said picking-up device comprises a first linear image sensor array for generating a chrominance signal; a second linear image sensor array for generating a luminace signal and a color filter having a number of red and blue color filter elements provided alternately in front of the first linear image sensor array.

6. An apparatus according to claim 5, wherein the apparatus further comprises a color filter having a number of red and blue color filter elements provided alternately in front of the first linear image sensor array.

7. An apparatus according to claims 1, wherein said picking-up device comprises a first linear image sensor array for generating a chrominance signal, a second linear image sensor array for generating a luminance signal and a color filter having red and blue color filter elements arranged in front of the first linear image sensor array, the numbers of red and blue color filter elements being made different from each other in accordance with a spectral sensitivity of the first linear image sensor array.

8. An apparatus according to claim 1, wherein the number of the blue color filter elements is larger by three times than that of the red color filter elements.

* * * * *